Jan. 28, 1969    T. H. BRIGGS ET AL    3,424,532
ANGLE-LAP TECHNIQUES FOR MEASURING LAYER THICKNESSES

Filed Dec. 29, 1964

INVENTORS T.H. BRIGGS
R.H. DUDLEY
BY
Roderick B. Anderson
ATTORNEY

United States Patent Office 3,424,532
Patented Jan. 28, 1969

3,424,532
ANGLE-LAP TECHNIQUES FOR MEASURING
LAYER THICKNESSES
Thomas H. Briggs, Allentown, and Richard H. Dudley,
Wescoesville, Pa., said Briggs assignor to Western Electric Company, Incorporated, New York, N.Y., a corporation of New York, and said Dudley assignor to
Bell Telephone Laboratories, Incorporated, New York,
N.Y., a corporation of New York
Filed Dec. 29, 1964, Ser. No. 421,784
U.S. Cl. 356—36        7 Claims
Int. Cl. G01b 9/02; G01n 1/00

This invention relates to thickness measurements, and more particularly, to precision layer thickness measurements by the angle-lap interferometry technique.

Current trends in the communications industry require semiconductive devices of increasingly higher frequency capabilities. To meet these requirements, certain semiconductor dimensions must be made extremely small to minimize spurious impedances. In some cases, epitaxial layer thicknesses, diffusion depths, and base widths have been reduced to less than 6000 angstroms, or approximately one wavelength of visible light. The tolerances involved in making and evaluating such devices are of course very exacting; in some cases layer thicknesses must be controlled to within one-sixteenth of a wavelength of visible light.

One known method of measuring the thickness of thin semiconductor layers is the so-called angle-lap technique in which one end of a device sample is beveled at a very small angle to expose a relatively broad surface of the layer to be measured. The beveled surface of the sample is stained or otherwise treated to delineate clearly the exposed surface of the layer. Monochromatic light is then directed through an optically flat glass plate onto the beveled surface. Light reflected from the beveled surface interferes with light reflected from the glass plate to establish interference fringes along those locations of the beveled surface that are displaced from the flat glass plate by some multiple of a half wavelength of the light. These fringes can therefore be interpreted as being contour lines representing successive graduations of height on the beveled surface. The distance between each pair of fringes, called an order of interference, is representative of a vertical distance of one-half wavelength. An operator counts the number of fringes located along the beveled layer surface to be measured, and thereby estimates the total thickness of the layer.

It can be appreciated that if the layer thickness to be measured is only two or three orders of interference thick, a substantial error can be introduced when the operator attempts to estimate fractional orders of interference. More importantly, the interference fringes are not well defined lines, but rather, shadowy bands that are darkest along their centers. Because of this distribution of light intensity in the interference fringes, the average operator cannot effectively estimate fractional orders of interference smaller than one-half, or approximately 1500 angstroms. As mentioned above, layer thicknesses of some devices must be controlled to within one-sixteenth of a wavelength, which requires a measurement of one-eighth of an order of interference.

Accordingly, it is an object of this invention to increase the precision of layer thickness measurements.

It is a specific object of this invention to increase the precision of layer thickness measurements by the angle-lap interferometry technique.

These and other objects of the invention are attained in an illustrative embodiment thereof which includes the apparatus and steps of the conventional angle-lap interferometry technique described above. One end of a sample of semiconductor wafer is beveled at a small angle to expose a relatively broad surface of a layer the thickness of which is to be measured. The beveled layer surface is stained to clearly reveal it and is photographed without the formation of any interference fringes. Interference fringes are then established along the beveled layer surface as described above, and a second photograph is made which reveals these fringes. The first photograph is scanned by a scanning densitometer to give a graphical indication of the horizontal length of the exposed layer. The second photograph is then scanned by the densitometer to give a graphical indication of the horizontal distance along the entire beveled surface along which an integral number of interference fringes extend. The thickness $t$ of the layer is then determined by the relation $$t = \frac{b'n\frac{\lambda}{2}}{l_n'} \quad (1)$$

where $b'$ is the horizontal length of the exposed layer, $n$ is the integral number of interference fringes along the entire beveled surface, $l_n'$ is the horizontal distance along which $n$ number of orders of interference were found to extend, and $\lambda$ is the wavelength of the interfering light.

As will be appreciated later, our technique inherently is more accurate than the conventional angle-lap technique because it effectively constitutes a measurement of the bevel angle along nearly the entire beveled surface, rather than merely a measurement of the layer surface. Therefore, localized imperfections in the bevel angle along the layer surface will not result in an inaccurate thickness measurement as in the prior technique. Secondly, since only an integral number of interference fringes are measured, there is no necessity for any estimation of fractions of orders of interference. Further, the measurement of a large number of interference fringes statistically gives more accuracy than merely the measurement of only one or two orders of interference within the layer surface. Finally, as will be explained more completely later, measurement of the interference fringes by use of the scanning densitometer is far more accurate than visual measurement because the precise centers of the fringes can be accurately determined. Moreover, the scanning of the two photographs can be made on identical graph paper of arbitrarily graduated units; the factors $b'$ and $l_n'$ can then be taken from the graphs in terms of these arbitrary units without any actual measurement of these factors being made. It will therefore be appreciated that an unskilled operator can easily and quickly make even more precise measurements with our technique than has formerly been possible.

These and other objects and features of our invention will be better appreciated from a consideration of the following detailed description taken in conjunction with the accompanying drawings in which.

Figure 1:
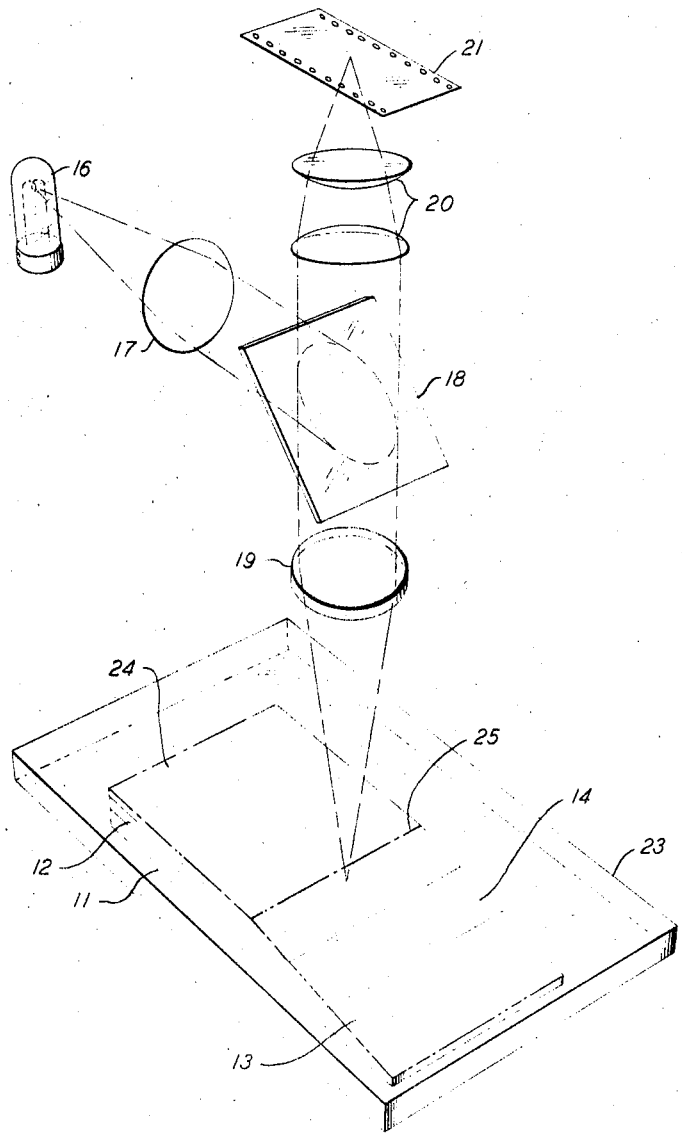
FIG. 1 is a schematic illustration of apparatus for measuring the thickness of a layer in a sample in accordance with one step of our technique.

Referring now to FIG. 1 there is shown a semiconductor sample 11 having a thin layer 12, the thickness of which is to be measured. In accordance with one step of our technique, one end of the sample is cut at a very small angle to form a beveled surface 13. The bevel angle typically may be on the order of 1 degree to 1.5 degrees in order to expose a relatively broad surface 14 of the thin layer 12, corresponding to a portion of the surface 13. A light source 16 emits substantially monochromatic light having a typical wavelength of 6000 angstroms which is directed onto the beveled surface 13 by a collector lens 17, a half-silvered mirror 18, and an objective lens 19. FIG. 1 is drawn on a very distorted scale; the focused light from objective lens 19 illuminates a spot which covers the entire surface 13 in a known manner. Light is reflected from the beveled surface 13 back through the objective lens 19, the half-silvered mirror 18 and a projection eye piece 20 of a camera having a photographic film 21. The beveled surface 14 of the thin layer 12 is preferably stained or otherwise treated in known fashion so that it will stand out clearly and distinctly on the photographic film 21 from the remainder of surface 13.

Figure 3:
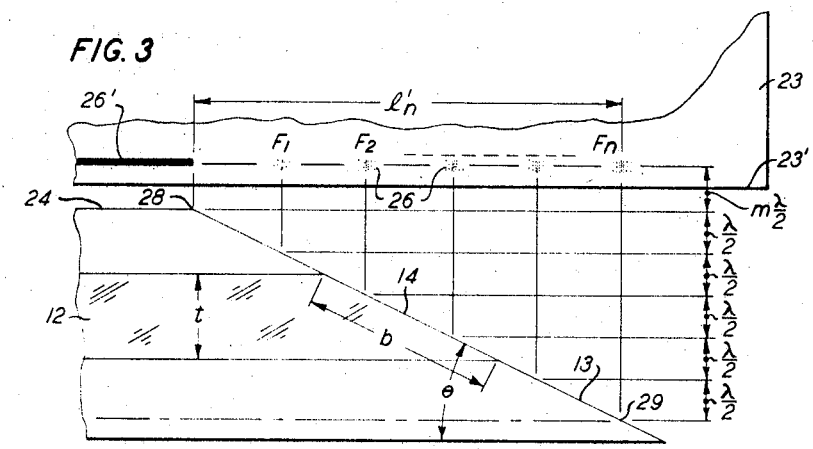
FIGS. 3 and 4 are side views of part of the sample of FIG. 1.

After the first photograph is made, an optically flat plate 23 of glass or other transparent material is placed in very close proximity to the upper surface 24 of sample 11 to extend over the beveled surface 13 as shown in FIG. 3. Light from source 16 is then reflected from the beveled surface 13 as described before. However, some of the reflected light will interfere with light reflected from the lower surface 23' of plate 23. As shown in FIG. 3, light which is reflected from locations on surface 13 that are some multiple of a half wavelength from the lower surface 23' will be 180 degrees out of phase with light reflected from surface 23' and will cancel it out, thereby establishing a shadowy band or interference fringe 26.

Figure 2:
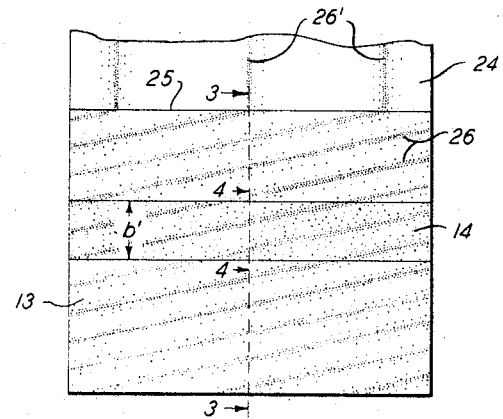
FIG. 2 is a top view of part of the sample of FIG. 1.

Interference fringes 26 are shown in FIG. 2 substantially as they would appear on the photographic film 21. As is known, it is convenient to adjust the plate 23 slightly so that the fringes 26' on the top surface of the sample are normal to the intersection 25 of the top surface with the beveled surface. This results in fringes 26 extending slightly diagonally across the surface 13 so that they intersect the boundaries of layer surface 14. As shown in FIG. 3, the successive fringes 26 are formed by light reflected from successive location on beveled surface 13 that are vertically displaced by one-half wavelength. Hence, by the conventional method of thickness measurement, an observer may estimate the thickness of layer 12 by counting the number of fringes, or more specifically, the number of orders of interference defined by the fringes, that are located between opposite boundaries of the beveled surface 14 of the layer.

Figure 4:
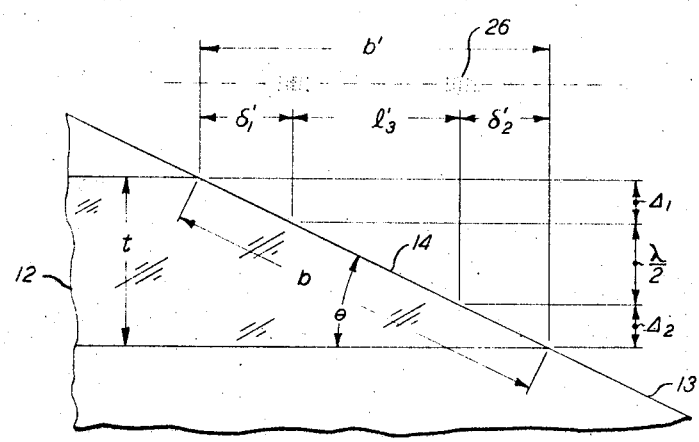

The horizontal distance $l'$ of FIG. 4 is the horizontal projection of one order of interference defined by successive fringes 26. The horizontal distances $\delta_1'$ and $\delta_2'$ are the horizontal projections of fractional orders of interference included within the boundaries of the beveled layer surface 14 having a surface width $b$. By the conventional angle lap technique the layer thickness $t$ is therefore equal to $$t = \frac{\lambda}{2}\left[1 + \frac{\delta_1'}{l_3'} + \frac{\delta_2'}{l_3'}\right] \quad (2)$$

where $\lambda$ is the wavelength of the light. In the example shown in FIGS. 2–4, approximately two orders of interference are included within the beveled layer surface 14. The thickness $t$ is therefore equal to approximately one wavelength of the light from source 16. It can be appreciated from FIG. 2, however, that the estimates of the fractional orders of interference $\delta_1'$ and $\delta_2'$ are very difficult because of the shadowy nature of the fringes. Further, localized imperfections often distort the interference fringes so that they are difficult to count. It is characteristic that effective estimates by this mehod of less than one-half of an order of interference cannot ordinarily be made.

In accordance with the invention, no visual observation of the fringes 26 is made; rather, they are photographed by film 21 for subsequent comparison with the first photograph described previously. The following theoretical development will aid in an understanding of our technique. With reference to FIG. 3, $l_n'$ is the horizontal distance between the two extreme interference fringes which are projected from points 28 and 29 on beveled surface 13. The bevel angle $\theta$ can then be determined by the relationship $$\tan \theta = \frac{n\frac{\lambda}{2}}{l n'} \quad (3)$$

where $n$ is the number of orders of interference between points 28 and 29 on the bevel surface, and $\lambda$ is the wavelength of the light. The horizontal projection $b'$ of the width of the beveled layer surface 14 as shown in FIGS. 2 and 4 is related to the thickness $t$ of layer 12 by $$t = b' \tan \theta \quad (4)$$

From Equations 3 and 4, the thickness $t$ may be expressed as $$t = \frac{b' n \frac{\lambda}{2}}{l_n'} \quad (5)$$

Figure 5:
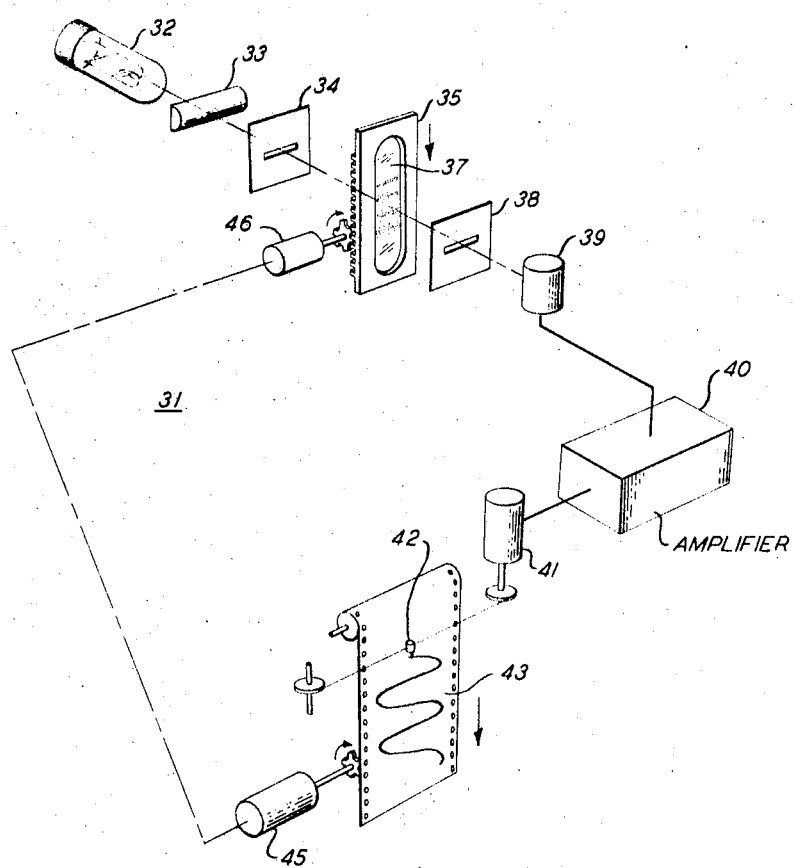
FIG. 5 is a schematic view of apparatus for making layer thickness measurements in accordance with another step of our technique.

The major source of error in determining Equation 5 is the measurement of $l_n'$. This results from the uncertainties in locating the centers of the fringes terminating $l_n'$. However, because these uncertainties are independent of the magnitude of $l_n'$ or of $n$, the error will be reduced as $n$ is increased. $b'$ and $l_n'$ may be measured in any arbitrary units which are consistent, because in the equation these dimensional units cancel each other out. Bearing these principles in mind, reference is next made to FIG. 5 which is a schematic illustration of densitometer apparatus 31 for analysing the two photographs which were made of the beveled surface 13 of the semiconductor sample.

The densitometer apparatus 31 comprises a light source 32, a collector lens 33, a collimator 34, and a photograph holder 35 for holding one of the photographs made of the beveled surface 13. Light directed through a photograph 37 proceeds through a second collimator 38 to a photocell 39. The photocell 39 generates an electrical current as a function of the intensity of the light impinging on it and transmits it to an amplifier 40. The amplifier controls a motor 41 which drives a recording pen 42 back and forth in accordance with varying electrical energy received by it. The pen makes a trace on a chart 43 which is driven in a vertical direction by a motor 45. The photograph 37 is likewise driven in a vertical direction by a motor 46 which is driven in synchronism with motor 45, or at some predetermined speed relationship with respect to motor 45.

In accordance with our technique, densitometer apparatus 31 is used to make a graphical representation on a chart of the photographic density of the two photographs made of the beveled surface 13. Each of the photographs is developed on a transparent or translucent medium such that the light from source 32 that is transmitted through it varies in proportion to the photographic density or darkness on it. Hence, as the photograph 37 and chart 43 are advanced, the stylus 42 gives a graphical indication on chart 43 of the photographic density or darkness on the photograph with respect to distance.

Figure 6:
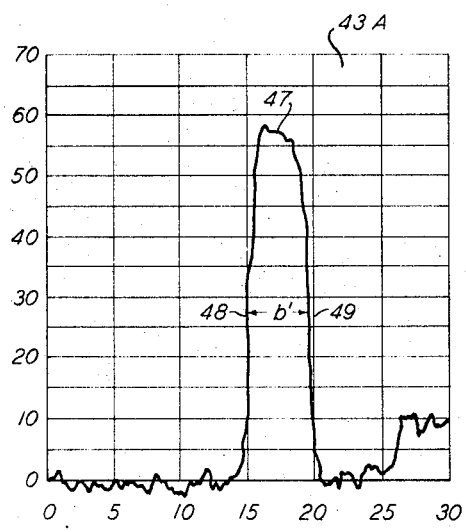

When the first photograph of surface 13 (without the fringes) is scanned by apparatus 31, a trace 47 is recorded as shown on chart 43A of FIG. 6. The trace portion lying roughly between positions 48 and 49 on the chart is indicative of the horizontal width $b'$ of the layer surface 14 of FIG. 2. The representation of this layer surface appears clearly on the densitometer chart 43A because the layer has been stained to make it much darker than the rest of beveled surface 13 and is therefore manifested by a high photographic density region on the photograph.

Figure 7:
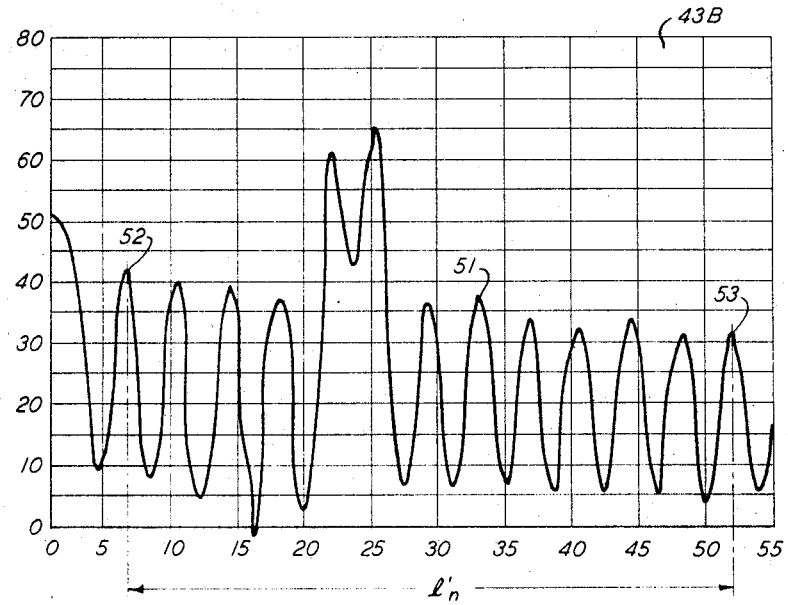
FIGS. 6 and 7 are replicas of densitometer recordings made in accordance with our technique.

A similar chart 43B shown in FIG. 7, is made of the photographic density on the second photograph of the beveled surface which contains the interference fringes. The trace 51 of chart 43B indicates the number and locations of the various interference fringes along the beveled surface. In determining $l_n'$ of Equation 4, the operator simply notes the distance between arbitrary extreme interference fringes such as the fringes manifested at locations 52 and 53 of chart 43B. This distance may be measured in the arbitrary units in which the chart 43B is graduated in the horizontal direction; that is, the distance between maxima 52 and 53 is approximately 45 chart units. The number $n$ of orders of interference along the distance $l_n'$ is computed by merely counting the number of maxima between locations 52 and 53. The number of orders of interference between fringe maxima in this case is equal to 12. The distance $b'$ is taken from chart 6 and is the distance between locations 48 and 49 which define the boundaries of the layer surface 14. With chart 43A graduated identically with chart 43B, this measurement can be made in the identical units as the measurement $l_n'$ and in this case is equal to approximately 5 chart units. The technique can, of course, be further simplified by using a calculator or small computer to compute the thickness $t$. A computer can be easily adjusted to include automatically the constant $\lambda$ of Equation 5.

It can be appreciated that by using the densitometer, the shadowy character of the fringes is of little consequence because the points of their maximum intensities can be easily determined from the maxima on trace 51. When computation of thickness $t$ is made in accordance with Equation 5, it is not necessary that $l_n'$ and $n$ be taken between opposite extreme fringes; however, this is desirable in most cases because the error is reduced as the quantities $l_n'$ and $n$ are increased. Although a determination of $b'$ by visually locating points 48 and 49 on the chart of FIG. 6 is more accurate than the prior method, a greater accuracy can be made by using known interpolation techniques to determine precisely the locations 48 and 49 which define the boundaries of beveled layer surface 14. Further precision can be attained by compensating for known non-linearities between the photographic density of photograph 37 and the transparency of the photograph to light. For most practical purposes, however, any errors resulting from such nonlinearities are negligible.

Various embodiments other than that described can be made of our invention. For example, any radiation of a wave-like nature can theoretically be used to establish interference fringes; even electron streams of the type used in electron microscopes can be used. Also, displays other than photographs could be used if so desired. Cathode ray displays could be used for giving darkness indications along the beveled surface, and various photoelectric systems other than that shown could be used. Numerous other modifications may be made without departing from the spirit and scope of our invention.

What is claimed is:
1. A method for measuring thin layers comprising the steps of:
   cutting the layer at a small bevel angle with respect to a horizontal reference surface of the layer to expose a surface thereof;
   staining the exposed beveled surface;
   photographing from a first location the beveled surface;
   locating a flat partially transparent surface over the exposed layer surface such that the partially transparent surface and the layer surface define an angle substantially equal to the bevel angle;
   reflecting substantially monochromatic light from the beveled surface and from the flat partially transparent surface to establish interference fringes;
   photographing from substantially the first location the interference fringes;
   scanning the two photographs separately with a scanning densitometer and recording on separate graphs variations with distance of photographic density on the photographs;
   determining from the graphs the horizontal distance $l_n'$ included by a number $n$ of orders of interference defined by said interfering fringes, and the horizontal width $b'$ of the exposed surface;
   and computing the thickness of said layer in accordance with the relationship

$$t = \frac{b' n \frac{\lambda}{2}}{l_n'}$$

where $\lambda$ is the wavelength of said light.

2. The method of measuring the thickness of a thin layer contained within a larger body comprising the steps of:
   cutting the body at an angle to expose a beveled surface of the body which includes a beveled surface of the layer;
   assuring that the beveled layer surface has different light-absorbing qualities from the remaining beveled body surface;
   directing wave-propagating energy including energy of wavelength $\lambda$ onto the beveled surface of the body such that energy reflected therefrom contains phase variations related to the slope of the beveled body surface;
   causing the reflected energy of wavelength $\lambda$ to interfere with energy of the same wavelength $\lambda$ that has not been reflected from the beveled body surface, thereby establishing interference fringes at wavelength $\lambda$;
   imaging the interference fringes onto a first plane which is at an angle with respect to the beveled body surface;
   imaging the beveled body surface onto a second plane that is parallel to or coincident with the first plane;
   measuring the projected width of the beveled layer surface as imaged onto the second plane, thereby determining a first parameter;
   counting the number of interference fringes projected onto the first plane, thereby determining a second parameter;
   measuring the projected width of that portion of the beveled body surface included within said number of interference fringes projected onto the first plane, thereby determining a third parameter;
   and determining from the wavelength $\lambda$ and the first, second and third parameters the thickness of the layer.

3. The method of claim 2 wherein:
   the layer extends in a horizontal direction and the layer thickness dimension $t$ extends in a vertical direction;
   the wave-propagating energy is directed in a vertical direction onto the beveled body surface;
   and the step of determining the thickness of the layer comprises the step of solving the relation $$t = \frac{b' n \frac{\lambda}{2}}{l_n'}$$

where $b'$ is the projected width of the beveled layer surface as imaged onto the second plane, $n$ is said number of interference fringes, and $l_n'$ is the projected width of that portion of the body beveled surface included within said number of interference fringes.

4. The method of claim 2 wherein said wave-propagating energy is light energy, and further comprising the step of:
   making a first photograph at the first plane of the interference fringes;

and wherein the counting step comprises the step of counting the interference fringes recorded on the first photograph.

5. The method of claim 4 further comprising the step of:
making a second photograph of the beveled body surface at the second plane.

6. The method of claim 5 further comprising the steps of:
recording on a first graph the spatial variations of light transmissability of the first photograph;
recording on a second graph spatial variations of light transmissability of the second photograph;
and wherein:
the step of counting the interference fringes of the first photograph comprises the step of counting the predominant spatial variations on the first graph;
the step of measuring the projected width of the portion of the beveled body surface comprises the step of measuring the distance included by said predominant spatial variations on the first graph;
and the step of measuring the projected width of the layer beveled surface comprises the step of measuring the distance included by a predominant spatial variation on the second graph.

7. The method of measuring the thickness of a thin layer which is part of a larger body comprising the steps of:
cutting the body at a small bevel angle with respect to a horizontal reference surface to expose a beveled surface of the body which includes a beveled surface of the layer;
assuring that the beveled surface of the layer has different light-absorbing qualities from that of the remaining body;
directing light from a source onto the beveled surface of the body;
causing light of wavelength $\lambda$ which is reflected substantially vertically from the body beveled surface to interfere with light from said source of the same wavelength $\lambda$ that has not been reflected from said body beveled surface, thereby establishing interference fringes at wavelength $\lambda$;
photographing from a predetermined location the interference fringes;
measuring the horizontal width $b'$ of the beveled layer surface from a photograph of the body beveled surface taken at said predetermined location;
measuring from the photograph of the interference fringes the horizontal distance $l_n'$ included by a number $n$ of orders of interference defined by said interfering fringes; and
computing the vertical thickness $t$ of the layer in accordance with the relationship $$t = \frac{b'n\frac{\lambda}{2}}{l_n'}$$

No references cited.

JEWEL H. PEDERSEN, *Primary Examiner.*

BERNARD LACOMIS, *Assistant Examiner.*

U.S. Cl. X.R.

356—108